United States Patent [19]
Mowery et al.

[11] Patent Number: 5,983,198
[45] Date of Patent: Nov. 9, 1999

[54] INTEGRATED SYSTEM MONITORING USE OF MATERIALS, CONTROLLING AND MONITORING DELIVERY OF MATERIALS AND PROVIDING AUTOMATED BILLING OF DELIVERED MATERIALS

[75] Inventors: Kevin M. Mowery, St. Louis; John P. Bartley, St. Charles; Robert J. Hantak; Richard E. Etling, both of St. Louis; Joseph R. Read, Chesterfield, all of Mo.

[73] Assignee: Novus International, Inc., St. Louis, Mo.

[21] Appl. No.: 08/636,289

[22] Filed: Apr. 23, 1996

[51] Int. Cl.⁶ ........................................... G06F 17/60
[52] U.S. Cl. ........................... 705/22; 705/16; 701/300; 701/202; 340/989; 340/990
[58] Field of Search ................... 701/300, 202; 340/989, 990; 705/22, 16

[56] References Cited

U.S. PATENT DOCUMENTS

| | | | |
|---|---|---|---|
| 4,455,483 | 6/1984 | Schönhuber | 235/375 |
| 4,563,739 | 1/1986 | Gerpheide et al. | 364/403 |
| 4,636,950 | 1/1987 | Caswell et al. | 364/403 |
| 4,688,244 | 8/1987 | Hannon et al. | 379/58 |
| 4,791,571 | 12/1988 | Takahashi et al. | 364/436 |
| 4,799,162 | 1/1989 | Shinkawa et al. | 364/436 |
| 4,857,925 | 8/1989 | Brubaker | 340/994 |
| 4,973,970 | 11/1990 | Reeser | 342/357 |
| 5,128,861 | 7/1992 | Kagami et al. | 705/10 |
| 5,154,314 | 10/1992 | Van Wormer | 222/1 |
| 5,270,921 | 12/1993 | Hornick | 364/407 |
| 5,272,638 | 12/1993 | Martin et al. | 701/202 |
| 5,289,183 | 2/1994 | Hassett et al. | 340/905 |
| 5,347,274 | 9/1994 | Hassett | 340/988 |

FOREIGN PATENT DOCUMENTS

| | | | |
|---|---|---|---|
| 19517882A1 | 11/1996 | Germany | G06F 19/00 |
| WO90/04834 | 5/1990 | WIPO | G06F 15/48 |

OTHER PUBLICATIONS

Nalco, "Porta–Feed Advanced Chemical Handling System," brochure, Jul. 1991, Bulletin 192.

Air Products, "Telalert®: The Electronic Eye on Your Product Supply," 1990, 4 pages.

(List continued on next page.)

*Primary Examiner*—Stephen R. Tkacs
*Assistant Examiner*—Raquel Alvarez
*Attorney, Agent, or Firm*—Senniger, Powers, Leavitt & Roedel

[57] ABSTRACT

The system and method include a fleet of vehicles to provide material to a plurality of tanks at various customer locations. An inventory indicator associated with each of the tanks provides a quantity signal to the central station indicating the quantity and temperature of each of the tanks. A processor at the central station monitors the quantity signals of each of the tanks to determine past usage rates of the contents of each of the tanks. The processor projects future tank quantities based on the past usage pattern and determines possible routes for each of the vehicles to each of the tanks. The processor optimizes the routes, delivery amounts, and delivery schedule to minimize total delivered cost for the products based on the projected future tank levels and the possible routes to dispatch each of the vehicles.

15 Claims, 5 Drawing Sheets

OTHER PUBLICATIONS

Chemical Marketing Reporter, "Unocal Pairs with Praxair," Dec. 6, 1993, p. 9.

Andersen Consulting and Linde Union Carbide, "Business Integration Success Story," brochure, 1995.

Chemical Marketing Reporter, "Airco Slates Delivery Center, Builds Nitrogen Unit for Valero," Jul. 5, 1993, 1 page.

Novus, "Alimet Inventory Management System," brochure, 1992.

Nalco, "Porta–Feed Plus Service," 1990, 2 pages.

Gibson, "Nalco Goes Back to Basics," Chemical Business, Nov. 1992, pp. 11, 13, 14.

Andersen Consulting, "Bulk Distribution System," 1993, 9 pages.

Bulk Distribution System, Andersen Consulting, pp. 1–8, 1989.

Aliment Inventory Management System, Novus, pp. 1–4, 1992.

Novus, "AMIS", brochure, 1995.

Fitzpatrick, The Journal of Feed Technology and Marketing, Feed Management, "Bulk Ingredient Handling: Automating a Mill's Ingredient Inventory", vol. 47, No. 2, Feb. 1996.

Fitzpatrick, Tecnologia Avipecuaria, "Automatizacion de Inventarios en una Planta de Alimentos Balanceados", vol. 9, No. 100, Reprinted from Feed Management 47(2) :8, 1996.

INTEGRATED SYSTEM MONITORING USE OF MATERIALS, CONTROLLING AND MONITORING DELIVERY OF MATERIALS AND PROVIDING AUTOMATED BILLING OF DELIVERED MATERIALS

BACKGROUND OF THE INVENTION

This invention generally relates to inventory management systems and methods that involve automatic product replenishment through vendor managed inventory. In particular, the invention relates to an integrated system monitoring use of materials stored in tanks, controlling and monitoring delivery of materials to the tanks, and providing automated billing of delivered materials through communications between the tanks, a central station, and delivery trucks.

Inventory management is known in the art. For example, the liquified gas industry has a gas delivery system which uses telemetry systems to monitor customer volume. The object of such systems is to provide substantially continuous product supply. However, such systems are not easily adapted for use in other industries such as manufacturing and supply of animal feed.

Other systems define trigger points which require automatic mandatory reordering when a trigger point, such as a certain tank level, is reached. Such systems do not optimize delivery routes or costs because only mandatory orders are generated. A mandatory order is an order that must be delivered to prevent a stockout whereas a discretionary order is an order that can be delivered if economical to the suppliers. Also, such systems are not flexible and do not accommodate discretionary orders.

Without automated inventory management, a site manager must determine when product is needed, how much product is needed, when products should be delivered, and how the tanks should be managed. The manager telephones or faxes the order to the supplier specifying delivery dates and amounts. The manager maintains control and accepts responsibility for down time that is a result of the site running out of a raw material. When inventory management becomes automated, that loss of control may seem alarming to both site managers and purchasing agents. However, in an automated inventory system, such as the invention, the software and equipment ensure product in the tanks at all times while allowing the customer to maintain control by establishing customized delivery parameters for each individual site.

SUMMARY OF THE INVENTION

It is an object of this invention to provide an inventory management system that reduces raw material stock-outs, eliminates product ordering, detects line flow failure and temperature-related flow problems, improves raw material delivery service and improves worker safety at the site.

It is another object of this invention to provide an inventory management system which maintains historical usage data and is capable of forecasting future usage.

It is another object of this invention to provide an inventory management system which provides simplified billing and reduces paperwork.

It is another object of this invention to provide an inventory management system which employs dedicated delivery equipment thereby eliminating tank truck washings and the associated waste disposal typical of non-dedicated fleets.

It is another object of this invention to provide an inventory management system which reduces chances of spills, overfills and contamination during delivery and returned heels on trucks because of inaccurate order quantities.

It is another object of this invention to provide an inventory management system which eliminates the need for thousands of drums and/or tote bins along with the environmental liabilities associated with container disposal or re-use.

It is another object of this invention to provide a continuous inventory monitoring facility having leak detection capability for liquid storage facilities thereby preparing customers for future regulatory compliance.

It is another object of this invention to provide a system which reduces the risk of injury by eliminating the need for employees to climb ladders, stairs, etc. to measure inventory and also eliminates guesswork and human errors on inventory management.

It is another object of this invention to provide continuously available inventory information regardless of time of day or weather conditions.

It is another object of this invention to provide a continuous usage monitoring system resulting in accurate usage history to reconcile against expected product usage and detect costly over-addition or under-addition of raw materials.

It is another object of this invention to provide an inventory management system including temperature monitoring to reduce costly system down time in extremely cold weather.

It is another object of this invention to economically deliver less than truckload quantities of raw materials and to process forecasted orders to minimize the suppliers cost of replenishing tank inventory.

In one form, the system is for use with a fleet of vehicles to provide material to a plurality of tanks at various customer locations. The system comprises a central station, an inventory indicator associated with each of the tanks and providing a quantity signal to the central station indicating the quantity in each of the tanks and a processor at the central station. The processor collects and stores information from the inventory indicators, monitors the quantity signals of each of the tanks to determine past usage rates of the contents of each of the tanks, projects future tank quantities of each of the tanks based on the determined past usage rates, determines possible routes for each of the vehicles to each of the tanks, optimizes the routes, delivery amounts, and delivery schedule for each of the vehicles based on the projected future tank quantities and the possible routes to minimize delivered cost, and dispatches each of the vehicles in accordance with the its optimized route and delivery schedule.

In another form, the system is for providing material to a plurality of tanks at various customer locations. The system comprises a fleet of vehicles to provide materials to the plurality of tanks, a central station, an inventory indicator associated with each of the tanks and providing a quantity signal to the central station indicating the quantity in each of the tanks, and a processor at the central station. The processor is for: collecting and storing information from the inventory indicators; monitoring the quantity signals of each of the tanks to determine past usage rates of the contents of each of the tanks; projecting future tank quantities of each of the tanks based on the determined past usage rates; determining possible routes for each of the vehicles to each of the tanks; optimizing the routes, delivery amounts, and delivery schedule for each of the vehicles based on the projected future tank quantities and the possible routes to minimize delivered cost; and dispatching each of the vehicles in accordance with the its optimized route and delivery schedule.

It is another object of the system to forecast demand for suppliers products to optimize production selectively.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
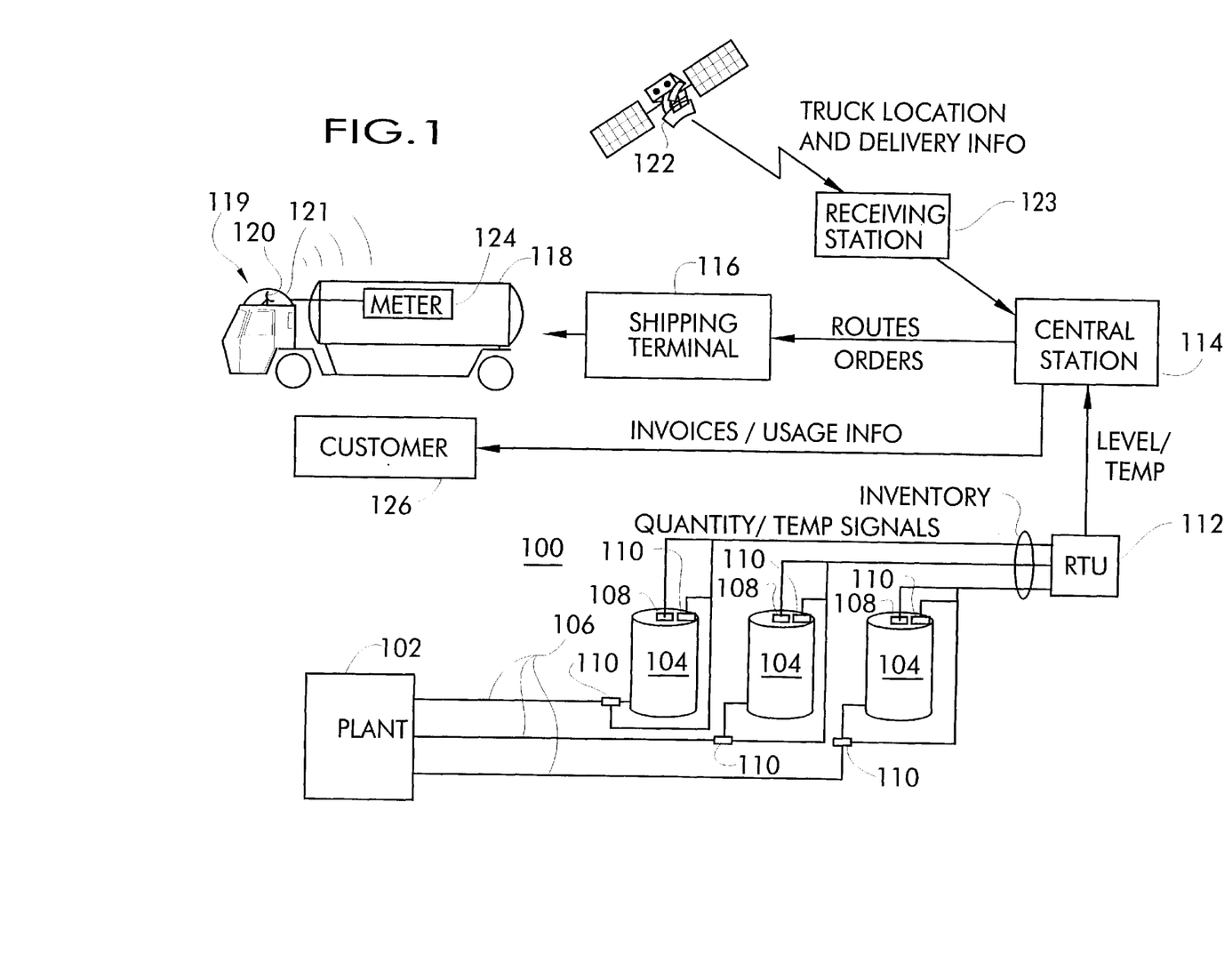
FIG. 1 is an illustration primarily in block diagram form of one preferred embodiment of an integrated inventory management system according to the invention.

As shown in FIG. 1, the integrated system 100 according to the invention successfully manages raw material inventory by incorporating the entire supply chain process of a plurality of locations, each having a material consuming plant 102. Generally, several tanks 104 supply liquid raw materials to each plant 102 in order to permit continuous operation. Supply lines 106 interconnect the tanks 104 supplying the plant 102 so that each raw material may be supplied on demand at the appropriate level. The continuous, uninterrupted operation of each plant 102 depends upon the inventory in each and every tank 104 being maintained so that all demands of each plant can be met. The integrated inventory management system 100 of the invention maintains the tank inventories 104 to permit such continuous, uninterrupted operation.

Each tank 104 includes a inventory measuring device such as level sensor 108 such as an ultrasonic level detector manufactured by Electronic Sensors, Inc. to generate quantity signals indicating the inventory in each tank 104. In addition, each tank is provided with one or more temperature sensor 110 such as a thermocouple for monitoring the temperature of the contents of each tank or the supply lines 106. Temperature signals generated by the temperature sensors 110 as well as the quantity signals generated by the level sensors 108 are provided to a remote telemetry unit (RTU) 112 which is programmed to communicate information to a central station 114 via standard voice telephone lines or other transmission link (e.g., cellular phone; satellite). As a result, the RTU 112 provides the central station 114 with level and temperature information. The information may be automatically provided to the central station periodically or may be obtained by polling from the central station. For example, the central station includes a processor (see FIG. 2) which collects and stores information from the level sensors 108 and the temperature sensors 110 by polling a tank after delivery to confirm that a delivery has been made. The RTU may be optionally provided with a local display so that the customer at the site may monitor the various levels and temperatures. When standard voice telephone lines are used to interconnect the RTU 112 and the central station 114, high speed modems for data transmission may be employed as is well-known in the art. Where hard-wired phone lines are impractical, wireless communication technology in conjunction with high-speed modems may be used to provide the level/temperature information to the central station 114. At the central station, telemetry data is collected using information systems that store, analyze, and report inventory and usage patterns, as will be described below in greater detail.

Material consumption at each plant 102 is predicted based on the particular site's historical consumption pattern and available information on future changes. Product delivery is optimally scheduled by the central station 114 based on the site inventory and site receiving characteristics. As a result, delivery of the raw materials to the tanks 104 is customized to fit the particular needs of the particular plant 102. The central station 114 provides the routes and orders information to a shipping terminal 116. A dispatcher at the central station 114 supervises a fleet of vehicles 118 for delivery the various products to the tanks 104. The orders may be mandatory orders which require delivery by a certain date in order to a avoid a tank level from going below a minimum level or may be discretionary orders which may be filled at the option of the dispatcher.

The central station 114 includes prediction software (such as Bulk Commodity Distribution provided by Manugistics, Inc.) to accurately predict expected usage and required delivery dates based on the unique usage patterns at each particular site. In addition, forecasted consumption levels can be adjusted by known changes in consumption patterns. This eliminates the possibility of emergency deliveries and stock-outs. In general, the central station 114 is operated by the material supplier who has daily access to the system data for analysis and interpreting the results to proactively warn each customer of potential malfunctions that can cause production problems. The central station 114 routinely provides invoices and usage information to the customer 120.

Each vehicle 118 is equipped with a satellite communications system 119 including a dish 120 protected by a radiotransparent cover 121. The system 119 takes advantage of the global positioning system to indicate to a satellite system 122 (such as QTRACS offered by Qualcomm, Incorporated) the position of the vehicle 118. This information is in turn relayed by the satellite 122 to a receiving station 123 which is connected (e.g., by telephone lines) to the central station 114 so that the central station 114 knows the position of each and every vehicle 118.

Each truck 118 is provided with a government certified meter 124 for accurate delivery of the right amount of product. The amount of product delivered at each location is communicated to the central station 114. In one embodiment, the meter 124 is directly connected to the satellite link 120 to provide such information automatically. Alternatively, it is contemplated that the vehicle driver may be provided with a keyboard (not shown) for entering delivery information which can be transmitted to the central station 114 via the satellite link-up 120 and satellite 122. It is contemplated that multiple stops by each vehicle during one route would be routinely handled and that many of, if not all, the stops may involve less than truckload quantities of liquids which are delivered. The two-way communication satellite system providing information between the vehicles 118 and the central station 114 ensures prompt billing to the customer 126 of the exact amount of product delivered in addition to providing to the central station 114 timely information on delivery status and truck location. In the event of weather, road, or equipment problems, the central station 114 is notified so that immediate action can be taken to ensure safe, on time product delivery.

Product consumption is predicted based on a particular site's historical consumption pattern and available information on future changes. Product delivery is optimally scheduled to each site based on site inventory and site receiving characteristics employing software such as Bulk Commodity Distribution (BCD) available from Manugistics.

Figure 2:
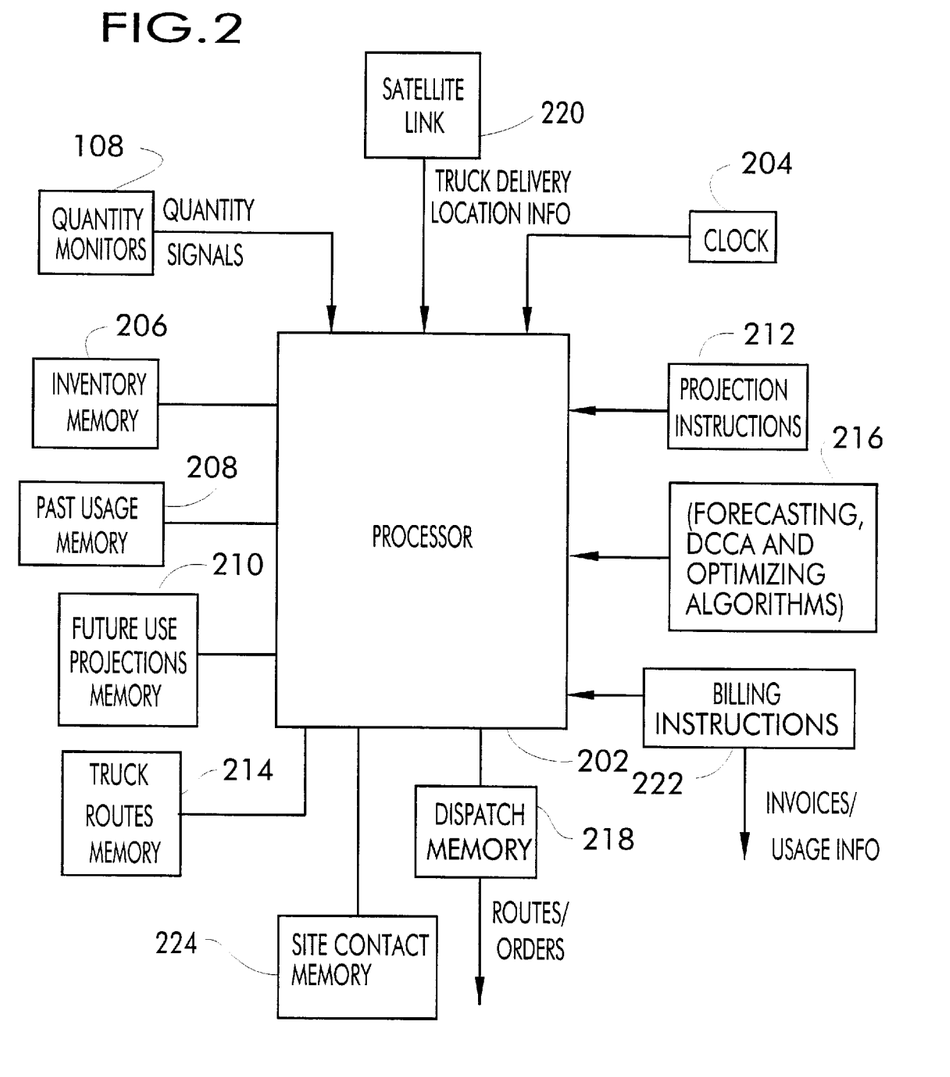
FIG. 2 is a block diagram of one preferred embodiment of the central station of the integrated inventory management system according to the invention.

FIG. 2 is functional block diagram of the central station 114. A processor 202 or other computer controls the operation of the central station 114. Although it is contemplated that the processor 202 may have an internal clock and internal memory, the functional block diagram illustrates a separate clock 204 and separate memories which will be described in more detail below. The processor 202 receives the quantity/temperature signals generated by the monitors 108, 110 so that the processor is provided with data indicating the level and temperature of each of the tanks 104. This inventory information is stored in inventory memory 206 so that the present level and temperature of each tank is immediately known and accessible by and through the processor 202. In addition, as the inventory memory 206 is updated by the processor 202, past usage information is stored in memory 208 so that the usage pattern for each tank 104 is monitored and available to the processor 202 for evaluation to determine past usage rates of the contents of each of the tanks.

Memory 210 includes future use projections which are generated by the processor 202 by the projection instructions 212 employing algorithms (e.g., BCD forecasting algorithms). These instructions 212 are software which evaluates the present inventory as indicated by memory 206 and which evaluates the past usage as indicated by memory 208 to project future tank quantities of each of the tanks based on the present inventory and past usage rates. The instructions 212 further take into account any specific factors which have been stored in the future use projections memory 210 which may affect future usage of the products within the tanks 104. For example, such software may take in account the following: seasonal shutdowns; periodic maintenance; weekly demand patterns; or competitive rotation (customer rotating supply from more than one supplier). The processor 202 uses the forecasted information to optimize total delivery cost. This is accomplished by applying optimizing algorithms (e.g., the BCD problem solving algorithm) which evaluates various scenarios for routing and scheduling and determines the particular scenario which would result in the lowest, total delivered cost while maintaining all tanks replenished with minimum inventory and meeting all other constraints of the system. In other words, forecasted orders are processed to minimize the cost of replenishing tanks.

In order to forecast future usage, the processor 202 may employ software which classifies consumption from the various tanks in different categories depending on usage. For example, the invention uses a dynamic consumption pattern routine to create, on demand and with varying parameters, a consumption class designation for each tank.

The dynamic consumption pattern routine allows assigned classes to be generated based on actual telemetry data looking backwards a preset number of days. The daily and weekly usage is calculated and various defaults and calculations are used to derive a consumption class key or pattern of the form "nnnnnnn." Each 'n' represents a digit from 0 to 4, which symbolically represent the estimated normalized product usage on the basis of a 24 hour production day by 7 days per week. A value of '4' signifies that regardless of how many actual hours the plant operates, their typical average usage for this day compared to an average week is roughly a normal full day of usage. Likewise, a value of '1' would indicate roughly a quarter-day's production, a value of '2' would indicate roughly a half-day's production and a value of '3' indicates a three-quarter day's production.

These values are normalized so that multiple sites can share the same pattern even though their absolute hours of usage may vary. The hours of operation are not nearly as important to the processor as knowing the relative usage patterns day by day and by day within a week.

Even though this designation can be dynamically computed, it may vary from a standard value that we wish to assign to a particular tank. For example, the dynamic computation could identify a '4344444' pattern for a site, even though they are normally in production 7 days per week on a level basis. Individual spikes, or unusual circumstances, or too short of a sampling period could all account for the apparently erroneous '3' in the pattern. In the case of a high volume-customer with known production plans, it is possible to pre-code their standard consumption pattern so that it overrides the dynamic pattern thereby assuring that BCD will generate a more precise demand forecast.

Due to the many variables involved, it is not possible to perfectly model consumption. However, taking this approach as a first step avoids relying on plans, hearsay, or myths about customer's product usage, and instead derives the needed data based on the same data that is used to manage customer inventory—the daily telemetry readings. For example, the following 28 classes may be established:

| CONSUMPTION CLASS | CONSUMPTION PATTERN |
| --- | --- |
| DEFAULT | M–F 4, SAT 0, SUN 0 |
| 9999999 | S–S 4 |
| 4444444 | S–S 4 |
| 4444442 | S–F 4, SAT 2 |
| 4444440 | S–F 4, SAT 0 |
| 4444421 | S–T 4, FRI 2, SAT 1 |
| 4444420 | S–T 4, FRI 2, SAT 0 |
| 2444444 | M–S 4, SUN 2 |
| 2444442 | M–F 4, SAT 2, SUN 2 |
| 2444441 | M–F 4, SAT 1, SUN 2 |
| 2444440 | M–F 4, SAT 0, SUN 2 |
| 2444420 | M–T 4, FRI 2, SAT 0, SUN 2 |
| 1444444 | M–S 4, SUN 1 |
| 1444442 | M–F 4, SAT 2, SUN 1 |
| 1444441 | M–F 4, SAT 1, SUN 1 |
| 1444440 | M–F 4, SAT 0, SUN 1 |
| 1444400 | M–T 4, FRI 0, SAT 0, SUN 1 |
| 1244444 | T–S 4, SUN 1, MON 2 |
| 0444444 | M–S 4, SUN 0 |
| 0444442 | M–F 4, SAT 2, SUN 0 |
| 0444441 | M–F 4, SAT 1, SUN 0 |
| 0444440 | M–F 4, SAT 0, SUN 0 |
| 0444420 | M–T 4, FRI 2, SAT 0, SUN 0 |
| 0444400 | M–T 4, F–S 0 |
| 0442440 | M–T 4, WED 2, T–F 4, S–S 0 |
| 0244440 | T–F 4, SAT 0, SUN 0, MON 2 |
| 0222220 | M–F 2, SAT 0, SUN 0 |
| 0000000 | UNKNOWN CONSUMPTION PATTERN |

Figure 3:
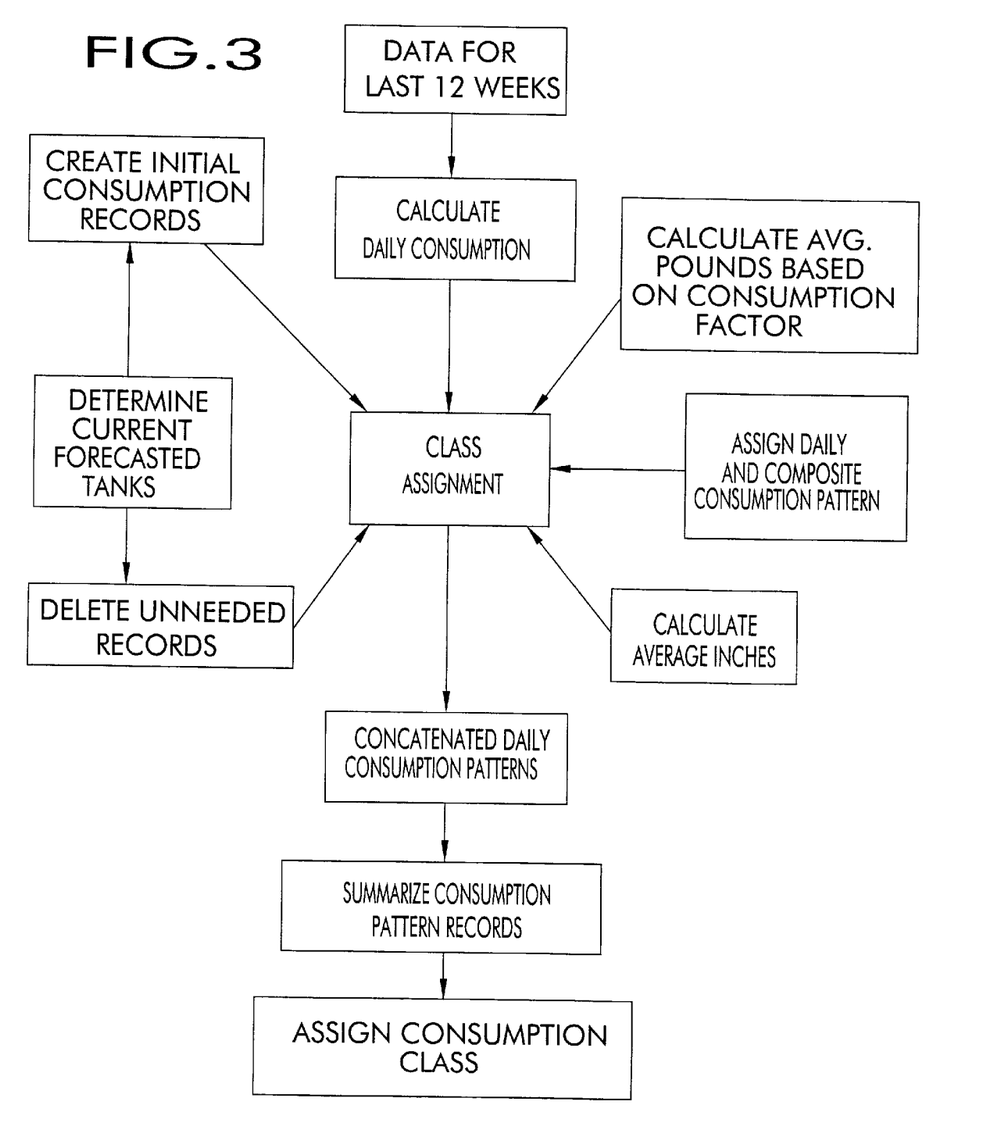
FIG. 3 is a flow chart in block diagram form of the information used by the operator and by the dynamic consumption class assignment algorithm routine for assigning a consumption class to each tank based on the past usage of the tank.

In the past, consumption classes were manually assigned by the operator using the data illustrated in FIG. 3. However, manual assignment can become a time consuming task in large scale systems. Therefore, it is also contemplated that the system may include a dynamic consumption class assignment (DCCA) routine as illustrated in FIG. 3 which may be executed by the processor to assign classes automatically. The routine would be used by the system to dynamically assign classes by analyzing the historical telemetry data stored in the past usage memory 208. The system may be programmed to periodically reevaluate (e.g., weekly batch processing) each consumption class of each tank and may also provide a printout to the operator of any consumption class changes which have been implemented.

In addition, processor 202 has access to a truck routes memory 214 which stores information indicating the various possible truck routes for each of the vehicles to the tanks of customers which are part of the system. Processor 202 executes optimizing instructions 216 (such as the BCD optimizing algorithm noted above) which evaluate the various projected usage stored in memory 210 in combination with the truck routes stored in memory 214 to provide dispatching information which minimizes total delivery cost. In particular, instructions 216 optimize the routes, delivery amounts, and delivery schedule for each of the vehicles based on the projected future tank quantities and the possible routes to minimize delivered cost. This information is stored in memory 218. This information in turn is provided to the shipping terminal 116 as routing or ordering information which is used by the dispatcher to control the vehicles 116 in accordance with the optimized route and delivery schedule. In addition, the processor is connected to the individual vehicles 118 by a satellite link 220 so that processor is aware of the truck location and delivery information for each vehicle.

As a result, the processor 202 monitors the quantity signals of each of the tanks 104 to determine past usage rates of the contents of each of the tanks, which usage rates are stored in past usage memory 208. The processor then projects future tank quantities of each of the tanks based on the determined past usage rates and stores such information in memory 210. Next, the processor optimizes the routes, delivery amounts, and delivery schedule for each of the vehicles based on the projected future tank levels and the possible routes. Finally, such optimized information is stored in the dispatch memory 218 and provided to the shipping terminal 116 for dispatching each of the vehicles in accordance with its optimized route and delivery schedule. Since it is contemplated that the system of the invention may be used with a dedicated fleet of vehicles, the processor 202 minimizes costs of delivery based on a fixed number of drivers and equipment which comprise a set of fixed resources. By taking into account various discretionary and mandatory orders, as noted below, the processor selects a delivery route and schedule which minimizes cost while maintaining inventory levels. As a result, the processor 202 minimizes delivered cost based on fixed resources of drivers and equipment while maintaining all tanks with a minimum inventory level.

In one preferred embodiment of the invention, the satellite links 120 and 220 each include a transponder which communicate with each other to allow the central station 114 to monitor the position of the dispatched vehicles 118. This link-up indicates to the vehicles instructions from the central station and indicates to the central station the position of the dispatched vehicles. When the meter 124 is directly connected to the satellite link 120, each of the vehicles indicates to the central station via the satellite link the amount of material delivered to a particular tank at a particular customer location by each of the dispatched vehicles. As a result, the processor generates billing information by executing billing instructions 222 (such as the ROSS Distribution Series) for generating invoices and usage information based on the amount of material delivered to a particular tank as indicated to the central station.

The integrated software and hardware of the system 100 of the invention may interface with a client service system that uses a central relational database so that multiple users can have real time access to core information. It is also contemplated that the projection instructions 212 may include additional forecasting software (such as BCD) to predict usage trends as well as product consumption. Also, optional routing and logistic software (such as BCD) may be provided which incorporates customer delivery preferences, eliminates the need for manual routing and scheduling, and optimizes the supplier's delivery equipment.

Optionally, the ultrasonic technology employed as level sensors 108 may be configured to achieve tank readings regardless of the tank geometry or raw material characteristics. This is accomplished by appropriate programming of the RTU.

The system may also be configured to allow customers to specify minimum and maximum inventory levels in each tank 104 and to allow the customer to specify acceptable days and times of receiving delivery at the plant 102. In addition, the system may adapt to the customer's daily shifts or allow the customer to change any scheduled plans.

Historical/forecasting software (such as BCD) generally identified as projection instructions 212 offers various benefits to the customer. Site managers can pinpoint usage levels from any day or portion of the day, or for any raw material monitored by the system. This data may be used for formulation verification and other analysis. In addition, software which is sensitive to historical usage detects increases or decreases from previous patterns. As a result, customers can be notified of these variations long before they would have noticed an equipment problem or inventory anomaly on their own.

More than simply recognizing a need for inventory replenishment and scheduling shipment, the order initiation software (such as BCD) which is part of the optimizing instructions 216 plans delivery based on the customer's multiple, customized specifications. In addition, routing and scheduling software (such as BCD) determines the best way to route the trucks.

The billing software which is a part of billing instructions 222 reduces effort and paperwork while maintaining timely and accurate billing. Accurate invoicing becomes even more of a challenge with multiple deliveries or limited availability of material. However, certified, metered trucks solve this problem when integrated with satellite technology that transmits delivery information instantaneously. Invoicing can also be consolidated to simplify the accounting process. It is even possible to obtain automated inventory management services for all liquid raw materials at the plant 102, under one umbrella, which provides one monthly invoice for all liquid raw material deliveries—a substantial time and cost savings for purchasing and accounting departments.

Figure 4:
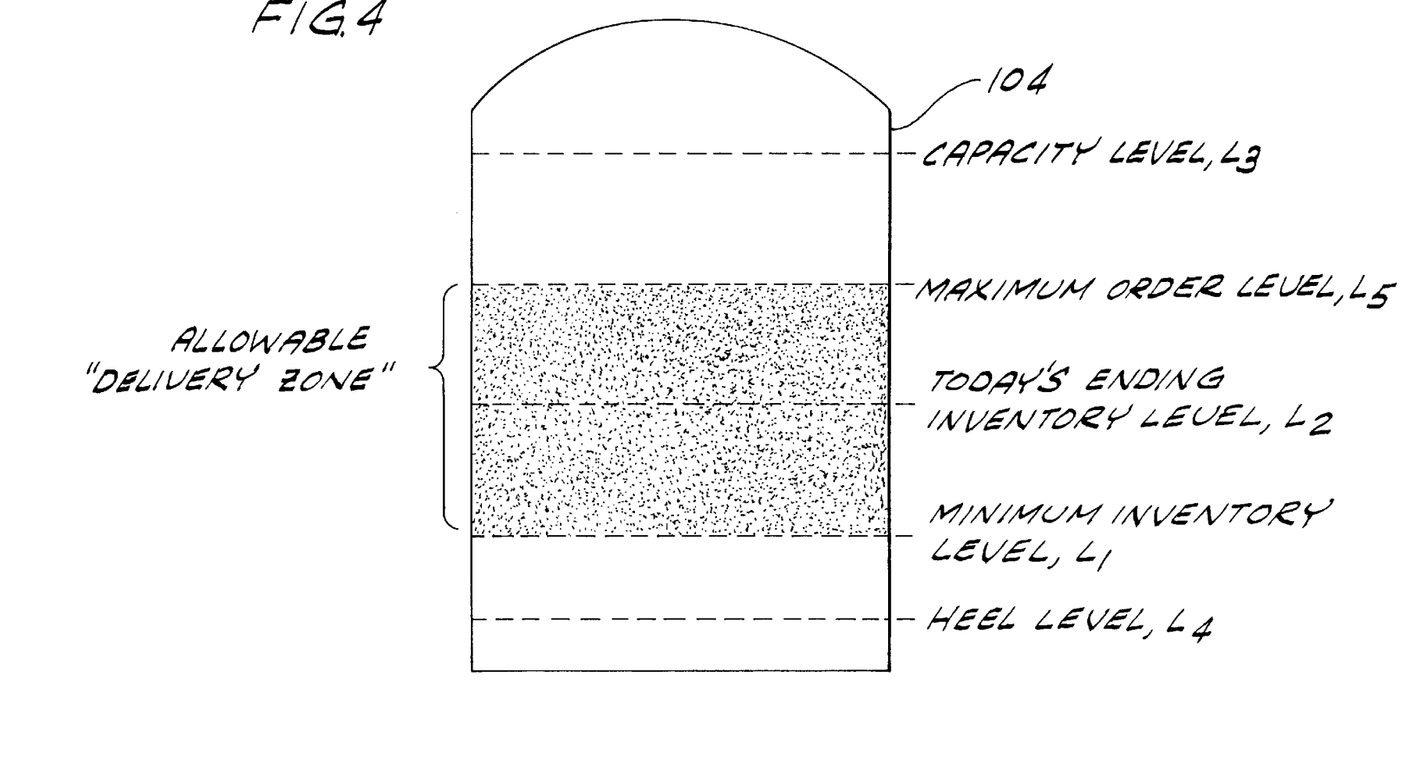
FIG. 4 is a vertical cross section of a tank illustrating various tank levels which relate to the system of the invention.

When raw material inventories are between the maximum order level and the minimum inventory level, order scheduling software can schedule delivery to ensure customer needs are met while optimizing routing and scheduling. FIG. 4 illustrates the various tank levels which affect the system decisions. Each tank 104 has a capacity and the processor 202 assigns a maximum order level for each tank which maximum order level is less than the capacity of the tank. The processor 202 then optimizes the routes, delivery amounts and delivery schedule for a particular tank based on a delivery that would not be made unless the tank level is below maximum order level $L_5$ of the particular tank and the tank level is above the minimum inventory level (see FIG. 5). The processor 202 also assigns (or defines) a heel level $L_4$ for each tank such that a minimum inventory level for each tank is greater than the heel level of the tank. The processor 202 optimizes the routes, delivery amounts and delivery schedule for a particular tank based on a delivery schedule that prevents the tank level from being less than the heel level of the particular tank. In particular, the following decisions are determined:

1. The timing of a delivery is determined by: a) forecasted usage from the tank; b) available capacities/usages of neighboring tanks/truck availability and utilization; c) a delivery may be made whenever tank level is in the "delivery zone;" and d) a delivery will be made before tank level reaches minimum inventory level $L_1$.

2. The amount of the delivery is determined by: a) available capacity of the tank (e.g., the capacity $L_3$ minus the ending inventory $L_2$); b) minimum delivery amount for tank; c) maximum delivery amount for tank; and d) available capacities of neighboring tanks/BTC truck utilization.

Figure 5:
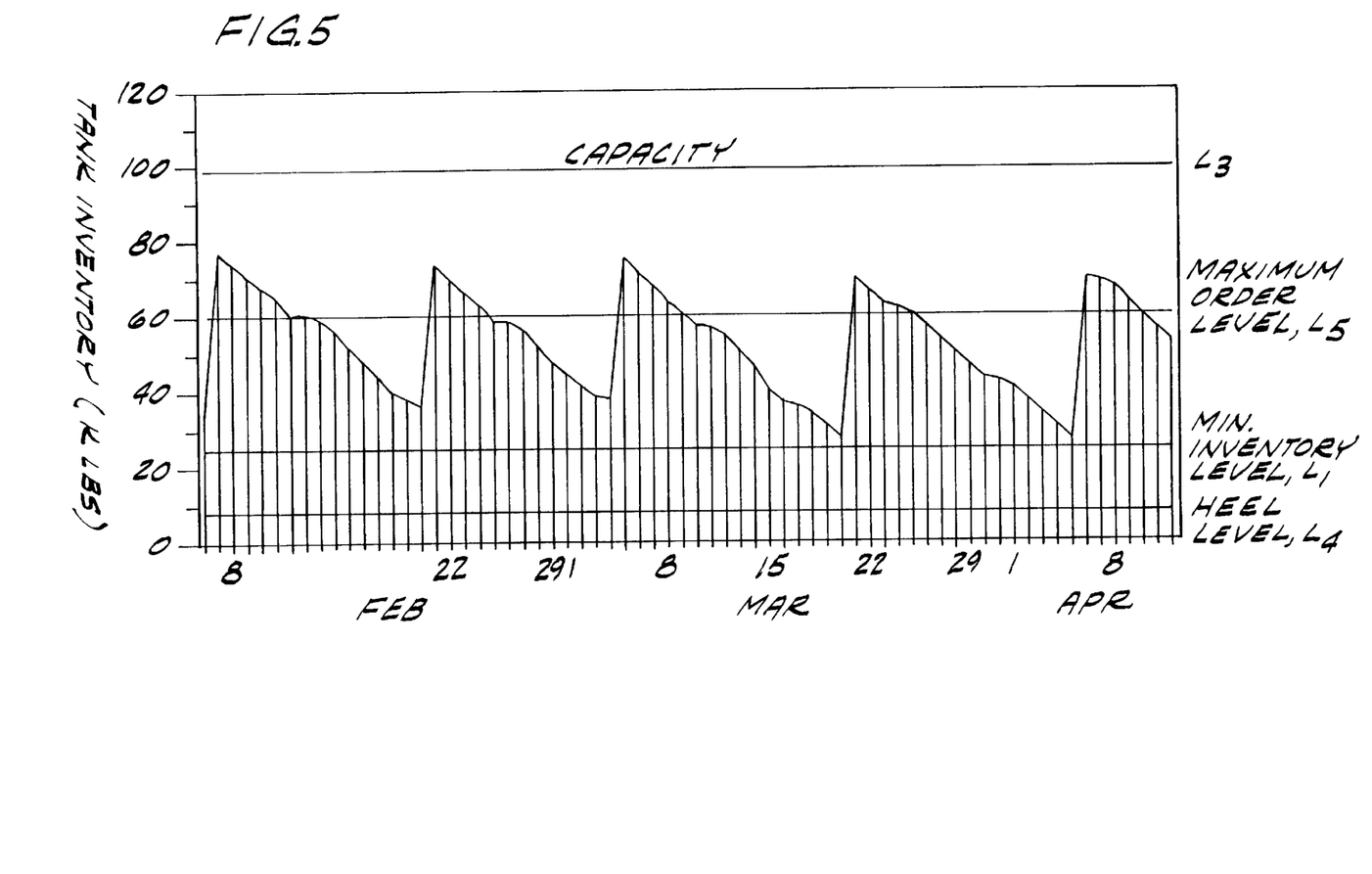
FIG. 5 is a graphing illustrating an exemplary tank inventory over time of a tank which is part of the system according to the invention, showing that the system of the invention maintains the tank level above the minimum inventory level and below the capacity of the tank.

For example, this system may be used with such liquid feed raw materials as methionine hydroxy analogue and ethoxyquin, and will generate inventory levels as shown in FIG. 5.

Billing instructions 222 link the system to the accounts receivable of the supplier. This allows the supplier to consider customer credit when making deliveries. For example, what effect would a delivery to a particular customer have on the credit status of the particular customer? If a delivery would cause the customer to exceed its credit limit, the supplier is notified to determine how to resolve the problem. Because of the link, the supplier has on line access to the credit records of each client and can immediately see future impacts of planned deliveries. Also, the system allows the supplier to specify and access one or more contacts via a site contact memory 224 for each location for each customer. For example, a customer may have separate contacts for delivery, for back-up delivery, for purchase orders or for questions regarding usage deviations. This memory allows the supplier to personally interface with the appropriate contact for each customer. Furthermore, every contact is with a customer recorded so that anyone who is a part of the supplier's system may determine who conducted the last communication with a contact and the reason for the communication.

The system of the invention may also have a delivery weight approval option. This option evaluates and keeps track of order quantities, origin quantities, meter quantities and customer weighed quantities. This system can be used to insure that an invoice for material is generated based on the quantity agreed upon with the customer, eliminating costly credits, debits and rework.

The invention also includes a method for using a fleet of vehicles to provide material to a plurality of tanks at various customer locations comprising the steps of:

collecting from an inventory indicator associated with each of the tanks a quantity signal provided to a central station indicating the quantity in each of the tanks;

storing information from the inventory indicators;

monitoring the quantity signals of each of the tanks to determine past usage rates of the contents of each of the tanks;

projecting future tank quantities of each of the tanks based on the determined past usage rates;

determining possible routes for each of the vehicles to each of the tanks;

optimizing the routes, delivery amounts, and delivery schedule for each of the vehicles based on the projected future tank quantities and the possible routes to minimize delivered cost; and dispatching each of the vehicles in accordance with the its optimized route and delivery schedule.

In view of the above, it will be seen that the several objects of the invention are achieved and other advantageous results attained.

As various changes could be made in the above system without departing from the scope of the invention, it is intended that all matter contained in the above description and shown in the accompanying drawings shall be interpreted as illustrative and not in a limiting sense.

What is claimed is:

1. A system for using a fleet of vehicles to provide material to a plurality of tanks at various customer locations comprising:

a central station;

an inventory indicator associated with each of the tanks and providing a quantity signal to the central station indicating the quantity in each of the tanks; and a processor at the central station for:

collecting and storing information from the inventory indicators;

monitoring the quantity signals of each of the tanks to determine past usage rates of the contents of each of the tanks;

projecting future tank quantities of each of the tanks based on the determined past usage rates;

determining possible delivery routes for each of the vehicles to each of the tanks;

optimizing the delivery routes for each of the vehicles based on the projected future tank quantities and based on the possible routes to minimize delivered cost;

optimizing the delivery amounts for the routes for each of the vehicles based on the projected future tank quantities and based on the possible routes to minimize delivered cost;

optimizing the delivery schedule for the routes for each of the vehicles based on the projected future tank quantities and based on the possible routes to minimize delivered cost; and dispatching each of the vehicles in accordance with the its optimized route and delivery schedule.

2. The system of claim 1 wherein each tank has a capacity and wherein the processor assigns a maximum order level for each tank which maximum order level is less than the capacity of the tank and wherein the processor optimizes the routes, delivery amounts and delivery schedule for a particular tank based on a delivery that would not be made unless the tank level is below maximum order level of the particular tank and the tank level is above the minimum inventory level.

3. The system of claim 2 wherein each tank has a heel level and wherein the processor assigns a minimum inventory level for each tank which minimum inventory level is greater than the heel level of the tank and wherein the processor optimizes the routes, delivery amounts and delivery schedule for a particular tank based on a delivery schedule that prevents the tank level from being less than the heel level of the particular tank.

4. The system of claim 1 wherein the processor generates discretionary orders and mandatory orders and wherein the processor optimizes the routes, delivery amounts and delivery schedule for a particular tank based on a delivery schedule that takes into account both discretionary orders and mandatory orders.

5. The system of claim 1 wherein the processor minimizes delivered cost based on fixed resources of drivers and equipment while maintaining all tanks with a minimum inventory.

6. The system of claim 1 further comprising a satellite link including a transponder on each of the vehicles communicating with the central station, said satellite link monitoring the position of the dispatched vehicles, indicating to the vehicles instructions from the central station and indicating to the central station the position of the dispatched vehicles.

7. The system of claim 6 wherein each of the dispatched vehicles indicates to the central station via the satellite link the amount of material delivered to a particular tank at a particular customer location and wherein the processor initiates the generation of billing information provided to each customer based on the amount of material delivered to a particular tank as indicated to the central station.

8. The system of claim 1 including an inventory memory storing level data indicating the level of material in each of the tanks, a past usage memory storing past usage data indicating the past usage rates of the material in each of the tanks, a future usage memory storing future usage data indicating information for projecting future usage of the material in each of the tanks, and a truck route memory storing routing data indicating the routes to be taken by the vehicles for supplying materials to each of the tanks.

9. The system of claim 8 including projection instructions projecting future levels of the tanks based on the level data, the past usage data and the future usage data, and including optimizing algorithms selecting the optimum routing data based on the projected future levels.

10. The system of claim 9 including billing instructions executed by the processor for generating invoicing and usage reports for each particular tank corresponding to past usage and delivery of materials to each particular tank.

11. The system of claim 1 wherein the processor assigns a consumption class to each particular tank based on past usage of the material in each particular tank and wherein the processor projects future tank levels based on the consumption class.

12. The system of claim 1 further comprising a meter on each vehicle for measuring an amount of material delivered to each particular tank, said meter having a transmitter for transmitting to the central station the amount of material delivered at each particular tank.

13. The system of claim 1 further comprising a temperature sensor at each tank for indicating a temperature corresponding to the temperature of the material in the tank and a link interconnecting the sensor and the central station and providing the indicated temperature to the central station.

14. A system for providing material to a plurality of tanks at various customer locations comprising:

a fleet of vehicles to provide materials to the plurality of tanks;

a central station;

an inventory indicator associated with each of the tanks and providing a quantity signal to the central station indicating the quantity in each of the tanks; and a processor at the central station for:

collecting and storing information from the inventory indicators;

monitoring the quantity signals of each of the tanks to determine past usage rates of the contents of each of the tanks;

projecting future tank quantities of each of the tanks based on the determined past usage rates;

determining possible delivery routes for each of the vehicles to each of the tanks;

optimizing the delivery routes for each of the vehicles based on the projected future tank quantities and based on the possible routes to minimize delivered cost;

optimizing the delivery amounts for the routes for each of the vehicles based on the projected future tank quantities and based on the possible routes to minimize delivered cost;

optimizing the delivery schedule for the routes for each of the vehicles based on the projected future tank quantities and based on the possible routes to minimize delivered cost; and dispatching each of the vehicles in accordance with the its optimized route and delivery schedule.

15. A method for using a fleet of vehicles to provide material to a plurality of tanks at various customer locations comprising the steps of:

collecting from an inventory indicator associated with each of the tanks a quantity signal indicating the quantity in each of the tanks;

storing information from the inventory indicators;

monitoring the quantity signals of each of the tanks to determine past usage rates of the contents of each of the tanks;

projecting future tank quantities of each of the tanks based on the determined past usage rates;

determining possible delivery routes for each of the vehicles to each of the tanks;

optimizing the delivery routes for each of the vehicles based on the projected future tank quantities and based on the possible routes to minimize delivered cost;

optimizing the delivery amounts for the routes for each of the vehicles based on the projected future tank quantities and based on the possible routes to minimize delivered cost;

optimizing the delivery schedule for the routes for each of the vehicles based on the projected future tank quantities and based on the possible routes to minimize delivered cost; and dispatching each of the vehicles in accordance with the its optimized route and delivery schedule.

* * * * *